United States Patent Office 2,876,064
Patented Mar. 3, 1959

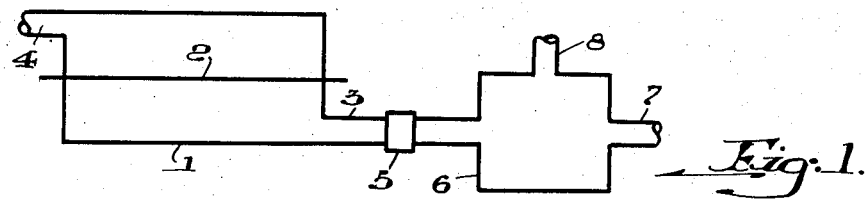
Fig. 1.
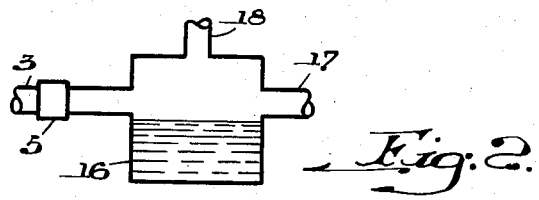
Fig. 2.
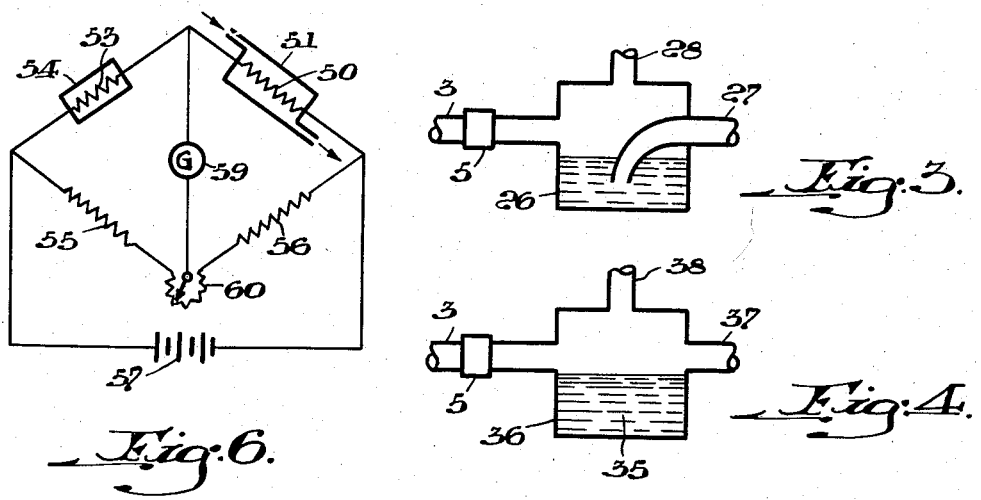
Fig. 6.
Fig. 3.
Fig. 4.
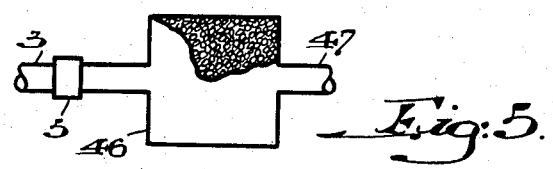
Fig. 5.
INVENTORS.
WILLIAM P. YANT
JOHN P. STRANGE
BY
*Egor G. Shlopak*
their ATTORNEY

2,876,064

PREVENTION OF CATALYST POISONING

William P. Yant and John P. Strange, Murrysville, Pa., assignors to Mine Safety Appliances Company, Pittsburgh, Pa., a corporation of Pennsylvania Application February 2, 1954, Serial No. 407,686

4 Claims. (Cl. 23—1)

This invention relates to the catalytic combustion of combustible gases and more particularly to combustible gases containing catalyst poisoning substances and method and means for preventing these substances from injuriously affecting the catalyst.

The catalytic combustion of combustible gases containing substances which when burned produce catalyst poisons presents a very serious problem in that the poisons take the form of substantially inert nonvolatile materials and adhere to the catalyst preventing a proper surface on the catalyst for further reaction of combustible gases thereon. In order that these poisonous constituents may be exhausted during the catalytic process, it is necessary to react them or their products with an anti-poisoning agent to produce a volatile substance capable of being exhausted along with the exhaustible combustion products. The phenomena of catalyst poisoning are clearly illustrated when testing combustible gases containing these poisonous substances.

In testing gases to determine the presence or amount, or both, of combustible constituents of gases, it is a practice, for example, to pass a sample of the gas to be tested over a heated catalytic filament in a balanced Wheatstone bridge or potentiometer circuit. The combustible constituents of the sample will burn at the filament causing the electrical resistance of the filament to change thus unbalancing the circuit and indicating the presence of these constituents. The amount of combustible constituents is measured from the extent of unbalance or change in the electrical resistance. The burned gas is then exhausted and the filament is available for further testing. This form of gas testing, however, has been found to be unfavorable when testing gases containing certain constituents which when burned produce catalyst poisons. These inert poisons will be deposited upon the surface of the filament to contaminate it and prevent contact of the combustible constituents of the gas sample with the active centers of the filament since the operating temperature of the filament is not normally high enough to remove or vaporize the inert material. Obviously, this impediment to the normal activity of the filament will affect its response and produce erroneous results. Thus, where concentrations of combustible constituents are present to provide an atmosphere which is flammable and/or toxic, the sensitivity of the test instrument may be so impaired as to prevent its indicating the presence of, much less the extent of, flammable and/or toxic conditions.

In the use of other test devices for determining the presence and/or amount of gases containing catalyst poisoning substances and which are other than those which employ a catalytic testing element of the hot wire type mentioned above, such as a bed of catalytic material whose heat of combustion is measured by thermocouples, the sample gas produces similar poisonous deposits on the catalytic element when combined therewith as heretofore described. That is, the poisonous or inert nonvolatile material is deposited on the catalyst preventing proper contact of the sample gas therewith and producing erroneous results.

Although the above description refers to the testing of combustible gases, this invention is not limited thereto in that it applies as well to any catalytic combustion of combustible gases contaminated with a catalyst poisoning substance employing an oxidation catalyst.

To overcome the above disadvantages, it is an object of this invention to provide a method of preventing catalyst poisoning during catalytic combustion of combustible gases contaminated by such poisons.

Another object is to provide a method and means for introducing a catalyst anti-poisoning agent to treat combustible gases which are to be catalytically burned.

A further object is to provide a means for catalytically testing combustible gases contaminated with catalyst poisoning substances.

Other objects will become apparent from the following description and accompanying drawing.

In accordance with the present invention, the combustible gas containing, as a constituent thereof, catalyst poisoning substances, is treated with an anti-poisoning agent and burned in the presence of a catalyst. Upon combustion, the poisonous substances would normally be deposited on the catalyst as an inert nonvolatile material preventing the testing or catalysis of the combustible constituents of the gas, but due to the presence of the anti-poisoning agent which combines with this material to remove or volatilize the same, the normal catalytic activity is unimpaired. After the catalytic reactions have been accomplished, the volatilized portion is exhausted along with the other burned or unreacted constituents. Thus, the invention provides for the continuous conversion of the inert poisoning material, either on the catalyst or in the immediate vicinity thereof, to a substance of high volatility which is then continuously exhausted in the form of a gas away from the catalyst.

In order to more specifically describe the invention with regard to how inert nonvolatile end products are produced when various combustible gas constituents which are oxidizable to form the inert poisoning products are burned on a catalyst, the combustion of a polydimethyl siloxane, arsine and stibine is exemplified by the following equations and discussions.

Octamethyl trisiloxane,

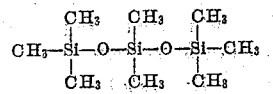

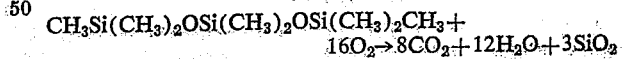

As seen by this equation, silicon dioxide ($SiO_2$) is produced, which is a relatively inert nonvolatile material. This material normally adheres to the catalyst, poisoning the same. Similarly, in the case of arsine ($AsH_3$)

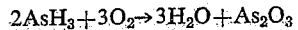

the inert material, arsenic trioxide ($As_2O_3$) is produced, and according to the equation

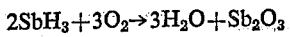

the inert or poisonous material, antimony trioxide ($Sb_2O_3$) is formed. To prevent this poisoning, an anti-poisoning agent, such as a fluorine containing compound, is mixed with the combustible gas prior to the burning on the catalyst in order that the inert material may be converted to a volatile substance.

Among the fluorine containing compounds employed for the above specified purpose are hydrogen fluoride-producing compounds, fluorinated hydrocarbons and hydrogen fluoride per se. The fluorinated hydrocarbon compounds include, by way of example, fluorotoluene, fluorobenzene, fluorobromobenzene and "Freons" such as difluorodichloromethane. The following equation shows how hydrogen fluoride (HF) is produced by burning fluorotoluene ($C_7H_7F$) as illustrative of the fluorinated hydrocarbons mentioned:

$$C_7H_7F + 8\tfrac{1}{2} O_2 \rightarrow 7CO_2 + 3H_2O + HF$$

From this equation, it is quite obvious how the other hydrogen fluoride producing compounds react when burned to produce hydrogen fluoride. It is sometimes more practical to use hydrogen fluoride-producing compounds rather than employ hydrogen fluoride directly since the latter, due to its well-known contaminating properties in the atmosphere, is not as convenient to handle when introducing this gas as an anti-poisoning agent.

The following examples illustrate the above-mentioned inert nonvolatile poisoning compounds and their reaction with an anti-poisoning agent when burned on a catalyst. Hydrogen fluoride is specified as the anti-poisoning agent in each instance for simplicity of explanation but it is to be understood that other fluorine containing compounds as heretofore mentioned may be suitably substituted for the hydrogen fluoride.

*Example I*

A combustible gas containing polydimethyl siloxane, commonly referred to as dimethyl silicone, which when burned produces as one of its end products silicon dioxide ($SiO_2$), when mixed with hydrogen fluoride (HF) and burned on a hot wire catalyst. When these compounds burned, the fluoride combined with silicon dioxide according to the following equation:

$$SiO_2 + 4HF \rightarrow SiF_4 + 2H_2O$$

Without the presence of hydrogen fluoride, the silicon dioxide produced, which, as mentioned, is a relatively inert nonvolatile material, would have deposited on and poisoned the catalyst. However, since the fluoride reacts with the silicon dioxide to produce silicon tetrafluoride ($SiF_4$), which is a gas at normal temperatures having a boiling point of $-65°$ C., and is exhausted with the other burned products, poisoning of the catalyst is prevented.

*Example II*

Similarly, as in Example I, a combustible gas containing arsine, which when burned produces inert arsenic trioxide ($As_2O_3$), is mixed with hydrogen fluoride and burned on a hot wire catalyst. Upon combustion, the hydrogen fluoride combines with the arsenic to produce a volatile arsenic-fluorine compound which is exhausted subsequent to the catalytic reaction.

*Example III*

As in Examples I and II above, a combustible gas containing stibine, which when burned produces inert antimony trioxide ($Sb_2O_3$), is mixed with hydrogen fluoride. The antimony trioxide combines with the hydrogen fluoride to produce an exhaustible antimony fluoride gas.

It is thus seen, according to the invention, that when combustible gases contaminated with compounds of silicon, arsenic and antimony which are oxidizable to produce nonvolatile oxides are catalytically burned, catalyst poisoning by the oxides is prevented by reacting a fluorine containing compound with the nonvolatile oxides to produce volatile fluorides.

Having described the invention relative to the principles by which catalyst poisoning is prevented in the catalytic combustion of combustible gases contaminated with catalyst poisons, reference is now made to the drawings for the application of the principle to the method and means for introducing the catalyst anti-poisoning agent to the contaminated combustible gases which are to be catalytically burned in which:

Fig. 1 represents schematically a device for the catalytic combustion of treated contaminated gases;

Figs. 2, 3, 4 and 5 show modified forms of the means for treating the gases; and Fig. 6 represents schematically a testing unit as applied to the present invention.

In Fig. 1 the combustion chamber 1 contains a catalyst 2 shown as representing a conventional hot wire type oxidation catalyst which reacts with a gas sample to burn combustible matter present. The invention is not restricted to a hot wire catalyst, however, since other oxidation catalysts may be used. Chamber 1 includes a gas inlet 3 and a gas outlet 4, gas inlet 3 being connected to a mixing chamber 6 by connection 5. Chamber 6 includes conduit 7 for the ingress of a sample gas containing poisonous oxidizable compounds of silicon, arsenic or antimony which will be catalytically burned on catalyst 2. A fluorine containing compound in the form of a gas at normal temperatures and pressures, such as hydrogen fluoride or difluorodichloromethane, is admitted through conduit 8 for mixing with the sample gas in chamber 6. This gas mixture passes through intake 3 into contact with the catalyst, and upon combustion, the fluoride gas present unites with the poisoning material to produce a volatile product which is exhausted through outlet 4 along with the other products of combustion and other constituents of the gas feed.

The modified forms of the invention shown in Figs. 2 to 5 illustrate the various ways in which the gas sample is treated with the fluorine containing compound to produce a gas mixture which when catalytically burned will prevent catalyst poisoning. Fig. 2 shows the fluorine containing compound in the form of a liquid admitted into chamber 16 through conduit 18 and which continuously liberates a fluoride gas to mix with the sample gas as it passes through conduit 17 across the mixing chamber 16 into gas inlet 3. The rate of evaporation of the liquid fluoride is controlled by the amount of surface exposed or by temperature of the liquid. For less volatile liquid fluorides the sample gas is bubbled through the fluoride liquid (Fig. 3) which has been admitted into chamber 26 through conduit 28. The conduit 27 serves as an admission means for the sample gas. In Fig. 4 a liquid fluorine compound is added to the liquid 35 in mixing chamber 36 through conduit 38. Liquid 35 and the fluoride liquid, in this embodiment, produce the sample gas by vaporization of some or all of the constituents of liquid 35 and vaporization of the fluoride liquid. For example, in the plastics and rubber industries where solvents are used, silicones are added to the solvents as antifoaming agents. This mixture vaporizes to produce a combustible gas contaminated with an oxidizable silicon compound. By adding a liquid fluoride compound capable of vaporization to the solvent, the resultant gas contains a fluoride gas or anti-poisoning agent. The liquid 35 is introduced into chamber 36 through inlet conduit 37. Liquid fluorides, such as fluorotoluene, fluorobenzene or fluorobromobenzene, are examples of the anti-poisoning agents employed in Figs. 2 to 4.

Chamber 46 (Fig. 5) contains a fluoride containing compound in a form of solid granular particles capable of liberating a fluoride gas. The contaminated gas sample enters chamber 46 by conduit 47 to pass through the granular material. Upon passing through the granular material, the gas sample mixes with the gaseous fluoride compound and in this state of mixture is burned on the catalyst.

Each of the above-mentioned chambers 6, 16, 26, 36 and 46 is constructed for connection to the inlet 3. Accordingly, it is seen in each embodiment that the sample gas containing catalyst poisons is first treated with a fluorine containing compound to provide an anti-poisoning agent for the gas sample prior to its reaction with the catalyst.

Fig. 6 illustrates the invention as applied to a conventional type of Wheatstone bridge gas analyzing apparatus. This apparatus comprises a testing filament 50 mounted in a glass envelope 51 having a gas inlet and exhaust.

The filament 50 is connected in series with a compensating filament 53 enclosed and sealed in chamber 54. The other branch of the circuit comprises fixed resistances 55 and 56, the branches are bridged by a galvanometer 59, and current is supplied through a battery 57 through connections as shown. In this embodiment, the circuit is balanced by a rheostat 60 after which the gas sample containing the anti-poisoning agent is passed to the test filament through the gas inlet to function as explained above. The combustible constituents of the sample will burn on the test filament 50 causing the electrical resistance of the filament to change, thus unbalancing the circuit and indicating the presence of these constituents. The extent of unbalance or change in electrical resistance is measured by the galvanometer 59 which indicates the amount of combustible constituents present. Any of the devices for mixing the anti-poisoning agent with the gas sample shown in Figs. 1 to 5 may be employed by merely connecting one of the chambers 6, 16, 26, 36 or 46 to the gas inlet of envelope 51.

Having explained the principle of the present invention and having illustrated and described what is considered to be the best embodiment, it is to be understood that, within the scope of the appended claims, the invention may be practiced otherwise than as specifically illustrated and described.

We claim:

1. In the catalytic combustion of combustible gases contaminated with compounds selected from the group consisting of arsenic, silicon and antimony compounds which are oxidizable to produce nonvolatile reaction products, a method of preventing catalyst poisoning by said nonvolatile reaction products, which comprises reacting with said products at least one fluorinated hydrocarbon selected from the group consisting of fluorotoluene, fluorobenzene, fluorobromobenzene and difluorodichloromethane to produce a volatile fluorine compound.

2. In the catalytic combustion of combustible gases contaminated with a compound of silicon which is oxidizable to produce a nonvolatile reaction product, a method of preventing catalyst poisoning by said nonvolatile product which comprises continuously reacting with said product a fluorine containing compound selected from the group consisting of fluorotoluene, fluorobenzene, fluorobromobenzene and difluorodichloromethane to produce a volatile fluorine compound.

3. In the catalytic combustion of combustible gases contaminated with a compound of arsenic which is oxidizable to produce a nonvolatile reaction product, a method of preventing catalyst poisoning by said nonvolatile product which comprises continuously reacting with said product a fluorine containing compound selected from the group consisting of fluorotoluene, fluorobenzene, fluorobromobenzene and difluorodichloromethane to produce a volatile fluorine compound.

4. In the catalytic combustion of combustible gases contaminated with a compound of antimony which is oxidizable to produce a nonvolatile reaction product, a method of preventing catalyst poisoning by said nonvolatile product which comprises continuously reacting with said product a fluorine containing compound selected from the group consisting of fluorotoluene, fluorobenzene, fluorobromobenzene and difluorodichloromethane to produce a volatile fluorine compound.

References Cited in the file of this patent

UNITED STATES PATENTS

| Number | Name | Date |
|---|---|---|
| 1,530,202 | Rodhe | Mar. 17, 1925 |
| 1,644,951 | Rodhe | Oct. 11, 1927 |
| 1,756,897 | Bilsky | Apr. 29, 1930 |
| 2,285,280 | Johnson | June 2, 1942 |
| 2,651,599 | Watts et al. | Sept. 8, 1953 |
| 2,687,342 | Strange et al. | Aug. 24, 1954 |

FOREIGN PATENTS

| 4,026 | Great Britain | 1902 |